United States Patent
Fujimaki et al.

(10) Patent No.: US 9,876,364 B2
(45) Date of Patent: Jan. 23, 2018

(54) POWER RECEIVING DEVICE, VEHICLE, AND POWER TRANSMISSION DEVICE

(71) Applicants: Takashi Fujimaki, Toyota (JP); Akira Mori, Anjo (JP); Toru Matsuzaki, Tajimi (JP); Taichi Ishihara, Kasugai (JP)

(72) Inventors: Takashi Fujimaki, Toyota (JP); Akira Mori, Anjo (JP); Toru Matsuzaki, Tajimi (JP); Taichi Ishihara, Kasugai (JP)

(73) Assignees: TOYOTA JIDOSHA KABUSHIKI KAISHA, Toyota (JP); KITAGAWA INDUSTRIES CO., LTD., Inazawa-shi (JP)

( * ) Notice: Subject to any disclaimer, the term of this patent is extended or adjusted under 35 U.S.C. 154(b) by 280 days.

(21) Appl. No.: 14/657,999

(22) Filed: Mar. 13, 2015

(65) Prior Publication Data

US 2015/0270717 A1 Sep. 24, 2015

(30) Foreign Application Priority Data

Mar. 24, 2014 (JP) ................................ 2014-059719

(51) Int. Cl.
| | |
|---|---|
| *H02J 5/00* | (2016.01) |
| *B60L 11/18* | (2006.01) |
| *H01F 27/36* | (2006.01) |
| *H01F 38/14* | (2006.01) |

(52) U.S. Cl.
CPC ............ *H02J 5/005* (2013.01); *B60L 11/182* (2013.01); *H01F 27/367* (2013.01); *H01F 38/14* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........................................................ H02J 5/005
See application file for complete search history.

(56) References Cited

U.S. PATENT DOCUMENTS

| | | | |
|---|---|---|---|
| 7,741,734 B2 | 6/2010 | Joannopoulos et al. | |
| 7,795,708 B2 * | 9/2010 | Katti ..................... | H01L 23/552 |
| | | | 257/659 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

*Primary Examiner* — Hai L Nguyen
(74) *Attorney, Agent, or Firm* — Oliff PLC

(57) ABSTRACT

This power receiving device includes a magnetic shield, and the magnetic shield includes: a first magnetic sheet located beside the power receiving unit; a conductive sheet located opposite to the power receiving unit with the first magnetic sheet interposed therebetween; and a second magnetic sheet located opposite to the first magnetic sheet with the conductive sheet interposed therebetween.

11 Claims, 21 Drawing Sheets

(56) References Cited

U.S. PATENT DOCUMENTS

| | | |
|---|---|---|
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0117596 A1* | 5/2010 | Cook .................. B60L 11/182 320/108 |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0181240 A1 | 7/2011 | Baarman et al. |
| 2012/0242447 A1 | 9/2012 | Ichikawa |
| 2013/0127409 A1 | 5/2013 | Ichikawa |
| 2013/0193749 A1 | 8/2013 | Nakamura et al. |
| 2013/0306364 A1 | 11/2013 | Suzuki et al. |
| 2014/0111021 A1 | 4/2014 | Nakamura |
| 2014/0346815 A1 | 11/2014 | Keutz et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103155737 A | 6/2013 |
| CN | 103620712 A | 3/2014 |
| DE | 102011056807 A1 | 6/2013 |
| EP | 1 902 505 A2 | 3/2008 |
| EP | 2 130 287 A1 | 12/2009 |
| EP | 2515314 A1 | 10/2012 |
| IN | 735/DELNP/2008 | 5/2008 |
| IN | 6195/DELNP/2009 | 7/2010 |
| JP | 2000-348916 A | 12/2000 |
| JP | 2008-288328 A | 11/2008 |
| JP | A-2009-501510 | 1/2009 |
| JP | 2009076513 A | 4/2009 |
| JP | 2012-038807 A | 2/2012 |
| JP | A-2012-079806 | 4/2012 |
| JP | 2013-523066 A | 6/2013 |
| JP | A-2013-110822 | 6/2013 |
| JP | A-2013-126327 | 6/2013 |
| JP | A-2013-132171 | 7/2013 |
| JP | A-2013-146148 | 7/2013 |
| JP | A-2013-146154 | 7/2013 |
| JP | A-2013-154815 | 8/2013 |
| JP | 2014-053366 A | 3/2014 |
| KR | 2008-0031398 A | 4/2008 |
| KR | 2010-0015954 A | 2/2010 |
| KR | 20120125604 A | 11/2012 |
| WO | WO 2007/008646 A2 | 1/2007 |
| WO | WO 2008/118178 A1 | 10/2008 |
| WO | WO 2011/074091 A1 | 6/2011 |
| WO | 2011112795 A1 | 9/2011 |
| WO | WO 2013/108108 A2 | 7/2013 |

* cited by examiner

POWER RECEIVING DEVICE, VEHICLE, AND POWER TRANSMISSION DEVICE

This nonprovisional application is based on Japanese Patent Application No. 2014-059719 filed on Mar. 24, 2014 with the Japan Patent Office, the entire contents of which are hereby incorporated by reference.

BACKGROUND OF THE INVENTION

Field of the Invention

The present invention relates to a power receiving device for receiving power from a power transmission device in a noncontact manner, a vehicle including the power receiving device, and a power transmission device for transmitting power to a power receiving device in a noncontact manner.

Description of the Background Art

As disclosed in Japanese Patent Laying-Open Nos. 2013-154815, 2013-146154, 2013-146148, 2013-110822, and 2013-126327, there have been known power transmission systems using power transmission devices and power receiving devices for transmitting and receiving power in a noncontact manner. WO 2011/074091 A and Japanese Patent Laying-Open No. 2013-132171 each disclose a coil and a magnetic shield. Particularly, in the magnetic shield disclosed in WO 2011/074091 A, a double-layer structure configured by a metal sheet and a magnetic sheet so as to face the coil is used.

SUMMARY OF THE INVENTION

In the magnetic shield, magnetic flux emitted from the coil enters the inside of the magnetic sheet, thereby suppressing the leakage of the magnetic flux to the outside. Furthermore, the metal sheet blocks the leakage of the magnetic flux rushing out of the magnetic sheet to the outside.

However, magnetic flux that reaches the metal sheet generates an eddy current on a surface of the metal sheet. This eddy current generates a new electromagnetic field. As a result, it is conceivable that this electromagnetic field is radiated from the surface of the metal sheet to the outside, and leaks to the outside.

The present invention has been made in view of the above problem, and an object of the present invention is to provide a power receiving device using a magnetic shield having a structure capable of more reliably suppressing radiation of an electromagnetic field to the outside, a vehicle including the power receiving device, and a power transmission device.

In each of these power receiving device, vehicle, and power transmission device, the magnetic shield includes a first magnetic sheet, a second magnetic sheet, and, a conductive sheet interposed between the first magnetic sheet and the second magnetic sheet.

By employing this magnetic shield configuration, an eddy current is generated on a surface of a metal sheet by magnetic flux rushing out of the first magnetic sheet. Even in a case where an electromagnetic field is radiated from a surface of the conductive sheet due to this eddy current, the second magnetic sheet can suppress discharge of the electromagnetic field to the outside.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment: Power Transmission System 1000

Figure 1:
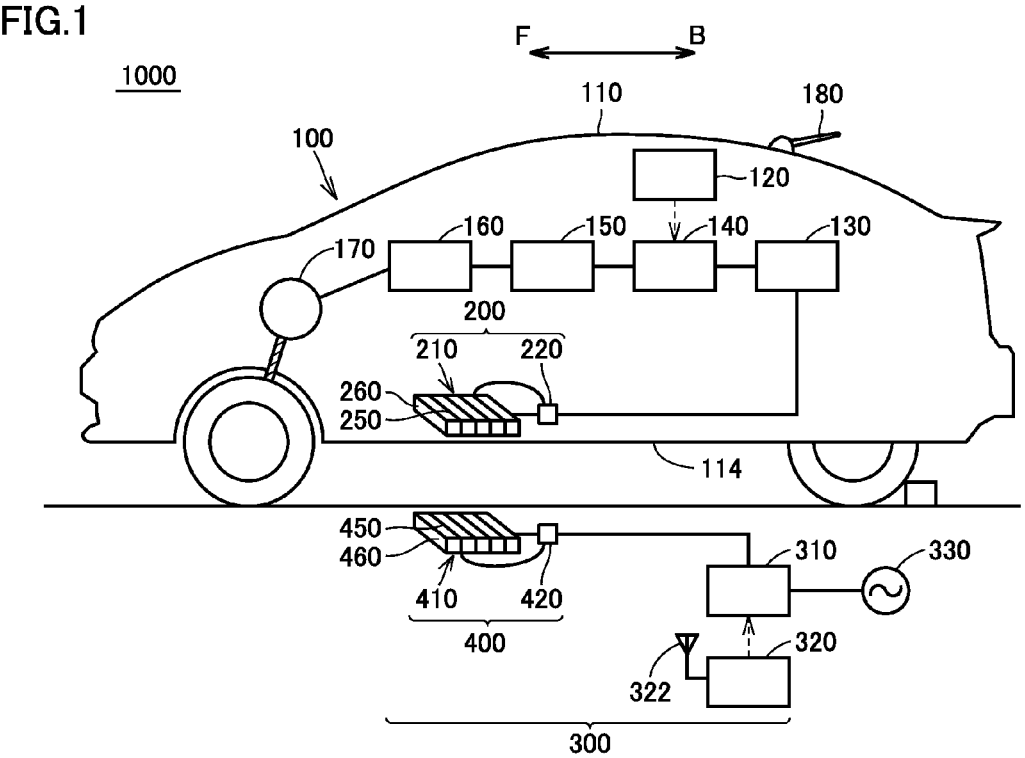
FIG. 1 is a diagram showing a power transmission system in a first embodiment.

With reference to FIG. 1, a power transmission system 1000 for transmitting power in a noncontact manner will be described. Power transmission system 1000 includes an electric vehicle 100, and an external power supply device 300. Electric vehicle 100 includes a vehicle body 110, and a power receiving device 200. Vehicle body 110 has a vehicle ECU 120, a rectifier 130, a DC/DC converter 140, a battery 150, a power control unit 160, a motor unit 170, a communication unit 180, and the like.

Power receiving device 200 includes a power receiving unit 210, and a capacitor 220. Power receiving unit 210 includes, for example, a power receiving coil 250, and a coil unit (ferrite core) 260. Power receiving coil 250 and capacitor 220 are connected in series, but may be connected in parallel.

The number of turns of power receiving coil 250 is appropriately set so as to increase a distance between power receiving coil 250 and a power transmission coil 450, a Q value (e.g., Q≥100) showing resonance strength of power receiving coil 250 and power transmission coil 450, a coupling coefficient κ showing a coupling degree of the resonance strength, and the like. Power receiving coil 250 is connected to rectifier 130. Rectifier 130 converts an AC current supplied from power receiving device 200 into a DC current, to supply the converted DC current to DC/DC converter 140.

External power supply device 300 includes a power transmission device 400, a high frequency power device 310, a power transmission ECU 320, and a communication unit 322. High frequency power device 310 is connected to an AC power supply 330, and power transmission device 400. Power transmission device 400 includes a power transmission unit 410 and a capacitor 420. Power transmission unit 410 includes, for example, power transmission coil 450 and a coil unit (ferrite core) 460. Power transmission coil 450 and capacitor 420 are connected in series, but may be connected in parallel. High frequency power device 310 converts power received from AC power supply 330 into high-frequency power, to supply the converted high-frequency power to power transmission coil 450. Power transmission coil 450 transmits power to power receiving coil 250 of power receiving unit 210 in a noncontact manner by electromagnetic induction.

(Structure of Power Receiving Unit 210)

Figure 2:
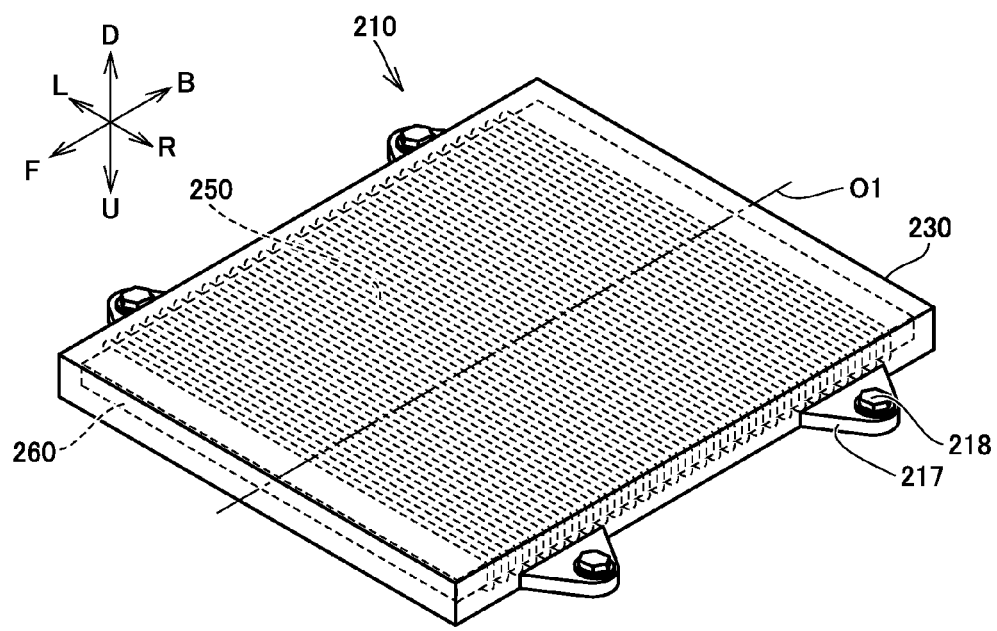
FIG. 2 is a perspective view showing a structure of a power receiving unit in a state mounted in a vehicle in the first embodiment.
Figure 3:
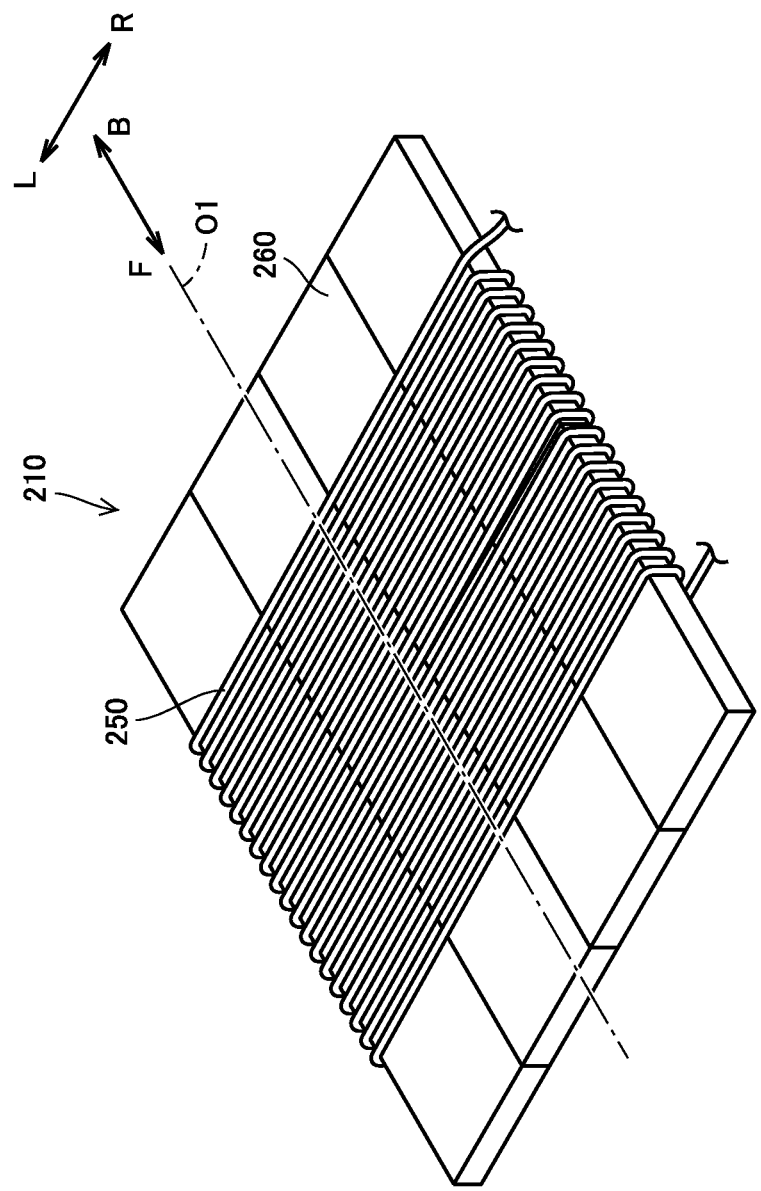
FIG. 3 is a perspective view showing a structure of a coil unit and a power receiving coil in a state mounted in the vehicle in the first embodiment.

With reference to FIGS. 2 and 3, a structure of power receiving unit 210 will be described. In the drawings, "D" denotes a vertically downward direction R. "L" denotes a vehicle left direction L. "R" denotes a vehicle right direction R. "F" denotes a vehicle forward direction F. "B" denotes a vehicle backward direction B. "U" denotes a vertically upward direction U. These are common in each drawing described later.

Power receiving unit 210 includes power receiving coil 250 and core unit 260. In core unit 260, power receiving coil 250 is spirally wound around surroundings including upper and lower surfaces of core unit 260 with a coil-winding axis (horizontal axis) O1 extending along a front-back direction (arrow BF direction in the drawing) of the vehicle as the center.

Core unit 260 has a plate-like shape as a whole. Core unit 260 is configured by combining a plurality of split cores, and these split cores are surrounded by insulating paper. As each of the split cores, ferrite is used. The core unit is not limited to the split cores, but may be a sheet of ferrite.

Power receiving coil 250 and core unit 260 are sealed by resin 230, and power receiving unit 210 has a flat plate-like cube shape as a whole. A total of four mounting flanges 217 integrally molded by resin and having attachment holes are provided on side surfaces of power receiving unit 210, and fixed to a floor panel 114 located on a bottom surface of vehicle body 110, by using bolts 218.

(Fixing of Power Receiving Unit 210)

Figure 4:
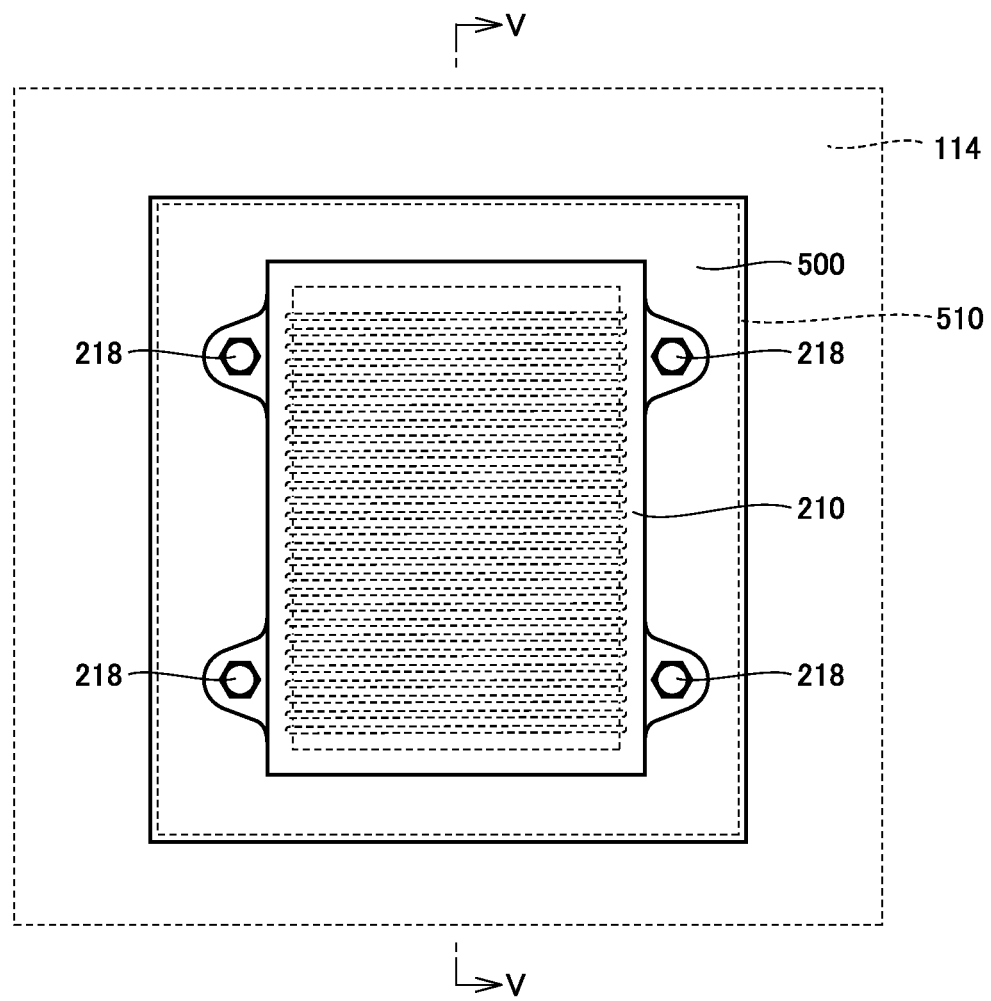
FIG. 4 is a diagram as viewed from below, showing an arrangement relation between the power receiving unit and a magnetic shield in a state mounted in the vehicle, in the first embodiment.
Figure 5:
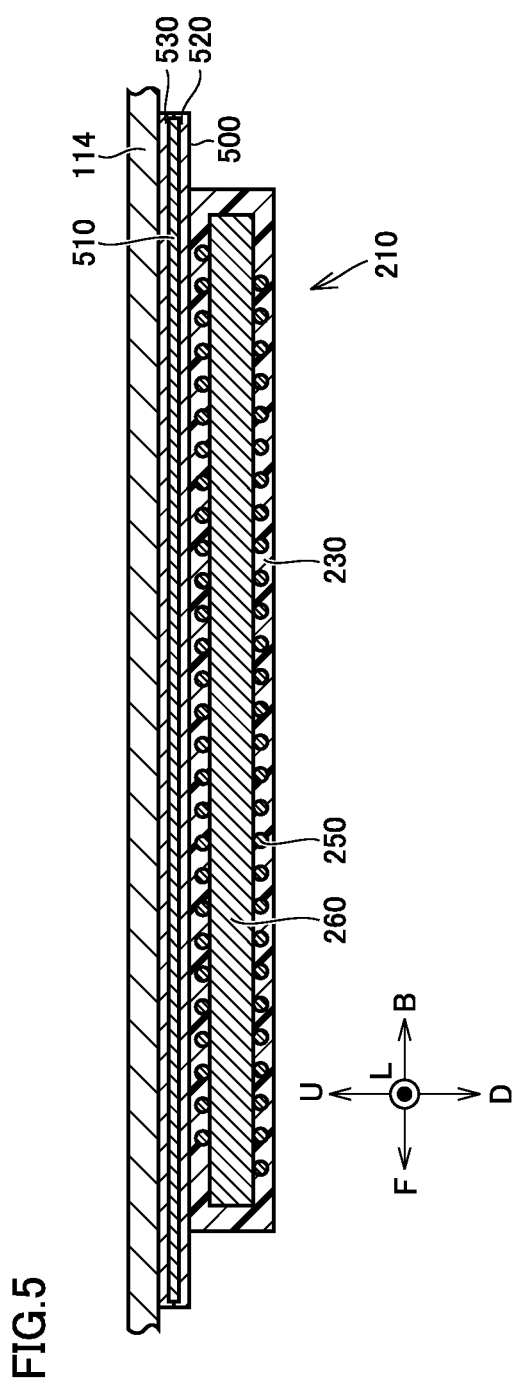
FIG. 5 is a sectional view taken along a line V-V in FIG. 4.

With reference to FIGS. 4 and 5, a fixed state of power receiving unit 210 to floor panel 114 will be described. A magnetic shield 500 is located on power receiving unit 210, and power receiving unit 210 and magnetic shield 500 are fixed to floor panel 114 such that magnetic shield 500 is interposed between power receiving unit 210 and floor panel 114. As shown in FIG. 4, a size of magnetic shield 500 is a size including power receiving unit 210 in plan view, and the whole of power receiving unit 210 faces magnetic shield 500. Specifically, an upper surface of power receiving unit 210 and a lower surface of magnetic shield 500 vertically face each other.

(Structure of Magnetic Shield 500)

Figure 6:
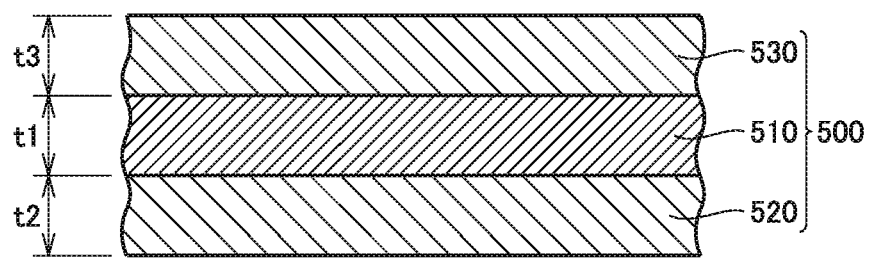
FIG. 6 is a sectional view showing a structure of the magnetic shield in the first embodiment.

With reference to FIG. 5 to FIG. 8, a structure and a function of magnetic shield 500 will be described. With reference to FIGS. 5 and 6, magnetic shield 500 includes a first magnetic sheet 520 located beside power receiving unit 210, a metal sheet 510 located opposite to power receiving unit 210 with first magnetic sheet 520 interposed therebetween, and a second magnetic sheet 530 located opposite to first magnetic sheet 520 (beside floor panel 114) with metal sheet 510 interposed therebetween.

That is, metal sheet 510 is interposed between first magnetic sheet 520 and second magnetic sheet 530. First magnetic sheet 520, metal sheet 510, and second magnetic sheet 530 have substantially the same planar size, and first magnetic sheet 520 and second magnetic sheet 530 are fixed at edges (whole circumference). The planar sizes of first magnetic sheet 520 and second magnetic sheet 530 each are desirable to be a planar area of power receiving unit 210. More specifically, the planar sizes of first magnetic sheet 520 and second magnetic sheet 530 each are desirable to be greater than or equal to the planar area of core unit 260.

A thickness (t2) of first magnetic sheet 520 and a thickness (t3) of second magnetic sheet 530 each are around 0.5 mm to 2 mm. As each of first magnetic sheet 520 and second magnetic sheet 530, for example, a sheet material having a layered structure configured by a ferrite layer as a magnetic material, and an insulating layer is used. The sheet is not limited the sheet having the layered structure, but may be a sheet having a magnetic characteristic.

As metal used in metal sheet 510, a material that generates less heat due to magnetic flux is suitable. For example, a sheet having copper as a base material is used, and the product name "REMILESS/REMI" manufactured by KITAGAWA INDUSTRIES CO., LTD. can be used. A thickness t1 of "REMILESS/REMI: registered trademark" is about 35 μm.

Although a case of using metal sheet 510 in magnetic shield 500 is described, the sheet is not limited to the metal sheet. Any conductive sheet may be employed. For example, a conductive sheet using graphite may be employed. The same applies in each of embodiments described below.

Figure 7:
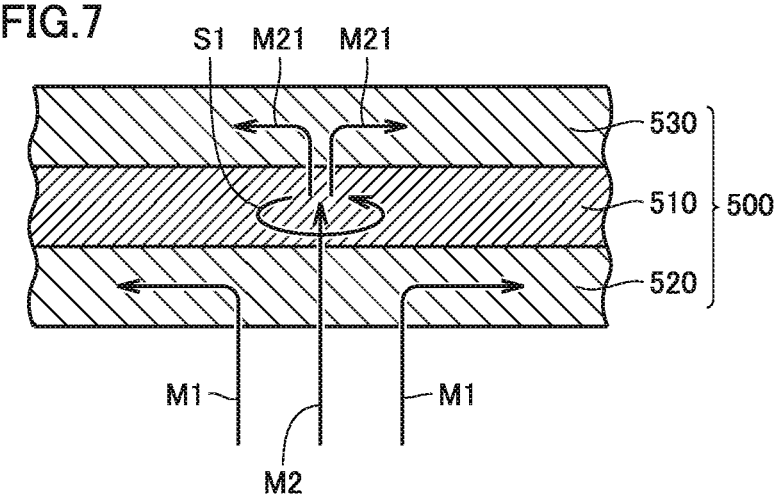
FIG. 7 is schematic sectional view illustrating a function of the magnetic shield in the first embodiment.

With reference to FIG. 7, by having a three layer structure including first magnetic sheet 520, metal sheet 510, and second magnetic sheet 530 described above, magnetic shield 500 has a function described below Most of magnetic flux M1 that rushes out of power receiving unit 210 enters the inside of first magnetic sheet 520. However, a part of magnetic flux M2 rushes out of first magnetic sheet 520 to reach metal sheet 510. On a surface of metal sheet 510, an eddy current S1 is generated due to the reaching of magnetic flux M2. A new electromagnetic field M21 is radiated from the surface of metal sheet 510 due to the eddy current S1. This radiated electromagnetic field M21 enters the inside of second magnetic sheet 530, thereby suppressing discharge of electromagnetic field M21 to the outside.

Figure 8:
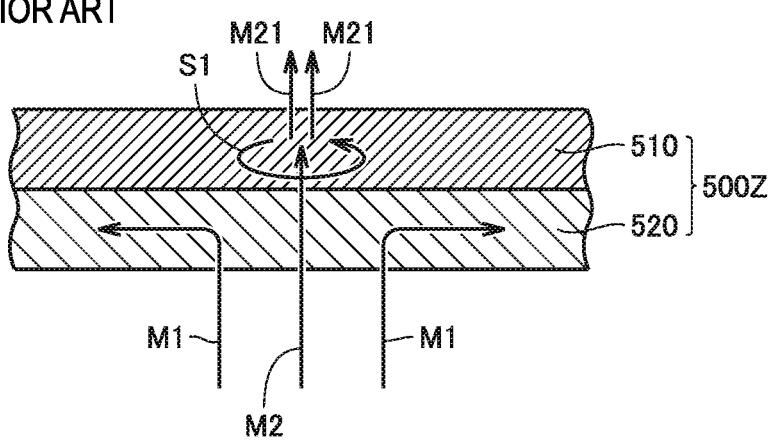
FIG. 8 is schematic sectional view illustrating a function of the magnetic shield in the background art.

On the other hand, as shown in FIG. 8, in the case of magnetic shield 500Z in the background art, second magnetic sheet 530 is not provided. As a result, electromagnetic field M21 generated on the surface of metal sheet 510 due to eddy current S1 is radiated to the outside.

Thus, in a case where magnetic shield 500 in this embodiment is used, second magnetic sheet 530 is provided, thereby enabling suppression of leakage of electromagnetic field M21 generated on the surface of metal sheet 510 to the outside (beside floor panel 114).

(Structure of Magnetic Shield of Another Mode)

Figure 9:
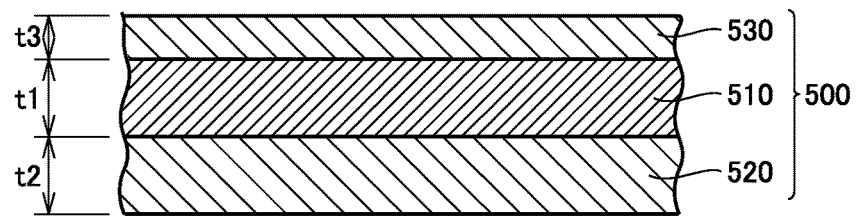
FIG. 9 is a sectional view showing a structure of a magnetic shield in another mode of the first embodiment.

FIG. 9 shows a sectional structure of a magnetic shield in another mode of this embodiment. A first magnetic sheet 520 located beside power receiving unit 210 forms a magnetic path resulting from magnetic flux entering the inside. Therefore, first magnetic sheet 520 is designed so as to have a thickness not causing magnetic saturation. On the other hand, an object of a second magnetic sheet 530 is to suppress leakage of an electromagnetic field M21 generated on a surface of a metal sheet 510 to the outside (beside a floor panel 114) as described above. Therefore, even when a thickness of second magnetic sheet 530 is reduced compared to a thickness of first magnetic sheet 520, magnetic saturation is not caused. Accordingly, a thickness (t3) of second magnetic sheet 530 may be made thinner than a thickness (t2) of first magnetic sheet 520. Consequently, it is possible to reduce a cost required for providing second magnetic sheet 530.

Second Embodiment

Figure 10:
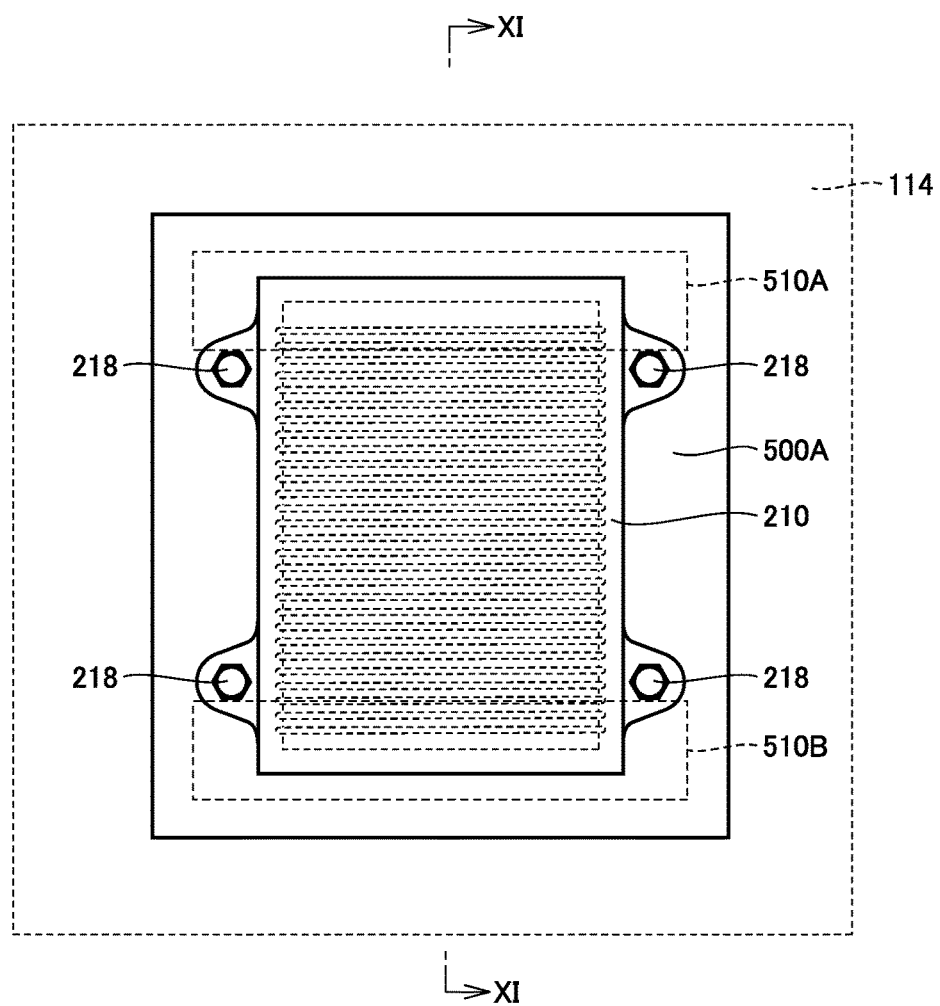
FIG. 10 is a bottom view (diagram as viewed from below) showing an arrangement relation between a power receiving unit and a magnetic shield in a state mounted in a vehicle in a second embodiment.
Figure 11:
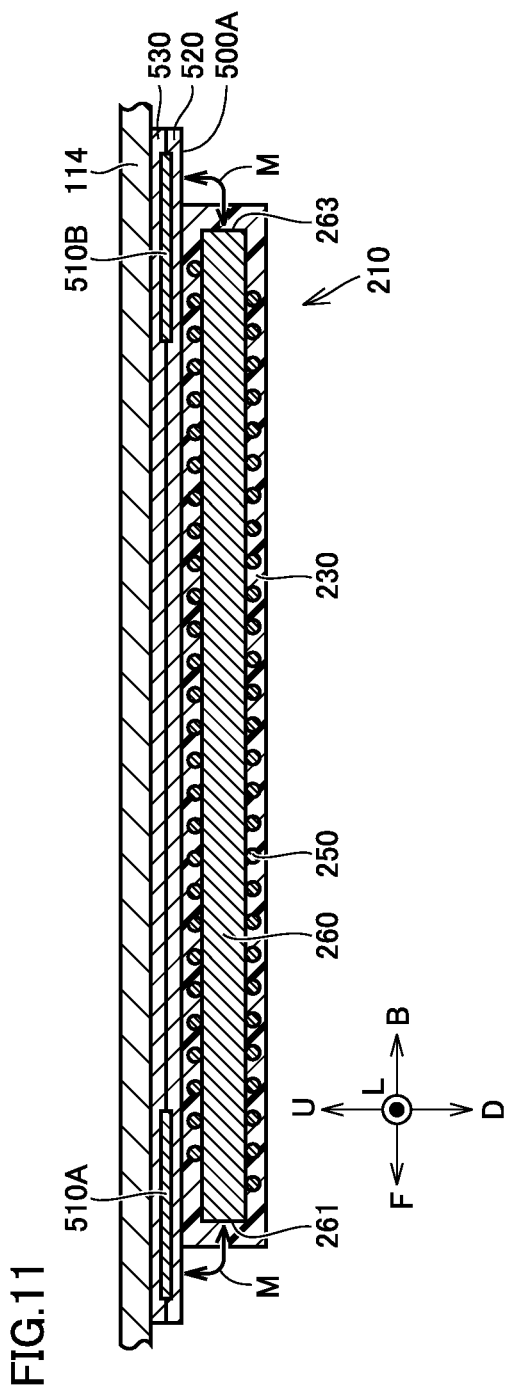
FIG. 11 is a sectional view taken along a line XI-XI in FIG. 10.

With reference to FIGS. 10 and 11, a structure of a magnetic shield of this embodiment will be described. FIG. 10 is a diagram as viewed from below showing an arrangement relation between a power receiving unit 210 and a magnetic shield 500A, and FIG. 11 is a sectional view taken along a line XI-XI in FIG. 10.

A metal sheet 510 used in magnetic shield 500 described above has a size including a whole surface of power receiving unit 210 in plan view. However, in a case of using power receiving unit 210 in which a power receiving coil 250 is spirally wound around a core unit 260 of this embodiment with a coil-winding axis (horizontal axis) O1 extending along a front-back direction (arrow BF direction in the drawing) of the above vehicle as the center, magnetic flux is intensively radiated/incident from both ends along coil-winding axis (horizontal axis) O1.

Accordingly, magnetic shield 500A may be configured such that metal sheet 510 includes two sheets, namely a first metal sheet 510A disposed beside a first end along coil-winding axis (horizontal axis) O1 of power receiving unit 210, and a second metal sheet 510B disposed beside a second end along coil-winding axis (horizontal axis) O1 of power receiving unit 210, and magnetic shield 500A is partially located on power receiving unit 210.

In this case, magnetic flux M is emitted (or incident) from each of end faces 261 and 263 of core unit 260, and therefore first metal sheet 510A is preferably disposed so as to include end face 261 in plan view, and second metal sheet 510B is preferably disposed so as to include end face 263 in plan view. That is, it is possible to suppress the size of the metal sheet compared to a case where a single metal sheet extending from end face 261 to end face 263. Consequently, it is possible to reduce a cost required for providing the metal sheet, and to reduce weight of the metal sheet.

In the example shown in FIGS. 10 and 11, magnetic flux is hardly radiated from a central part (part located between end face 261 and end face 263) of power receiving unit 210 to the outside. Therefore, as shown in FIGS. 10 and 11, even when the metal sheet is not disposed at the central part of power receiving unit 210, magnetic flux radiated to the outside is few.

In order to suppress the leakage of the magnetic flux radiated from the central part of power receiving unit 210 to the outside, the metal sheet extending in the front-back direction may be formed such that first metal sheet 510A and second metal sheet 510B are partially connected to each other.

Third Embodiment

While the attachment of power receiving unit 210 and magnetic shield 500 to floor panel 114 is described in the above embodiment, the attachment of a power transmission unit 410 and a magnetic shield 500 to a parking area B in an external power supply device 300 will be described in this embodiment with reference to FIG. 12 to FIG. 14.

(Structure of Power Transmission Unit 410)

Figure 12:
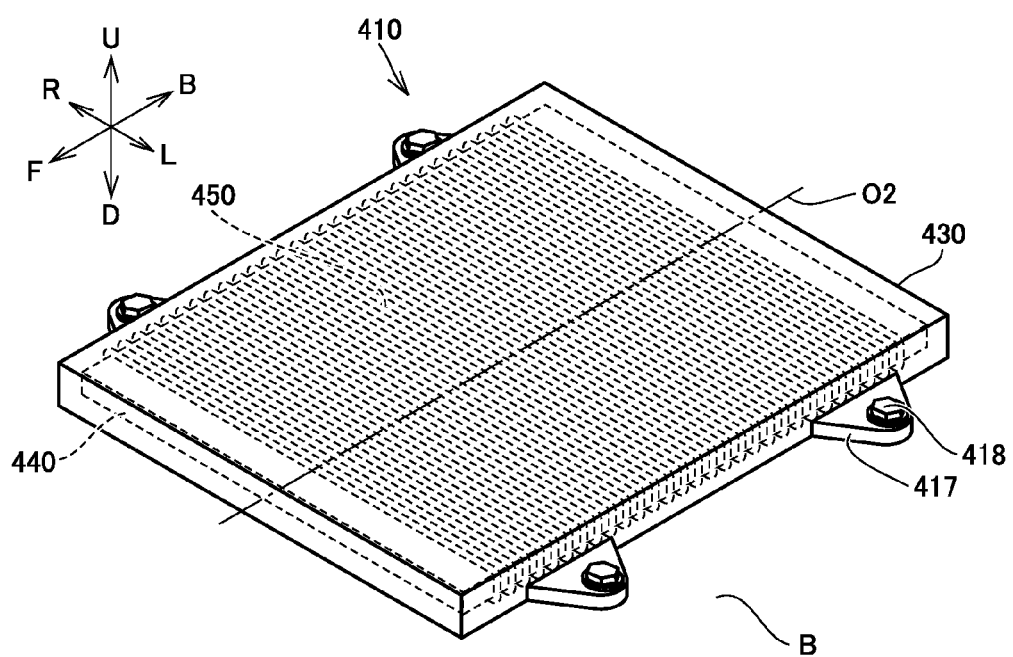
FIG. 12 is a perspective view showing a power transmission unit in a state placed in a parking area in a third embodiment.
Figure 13:
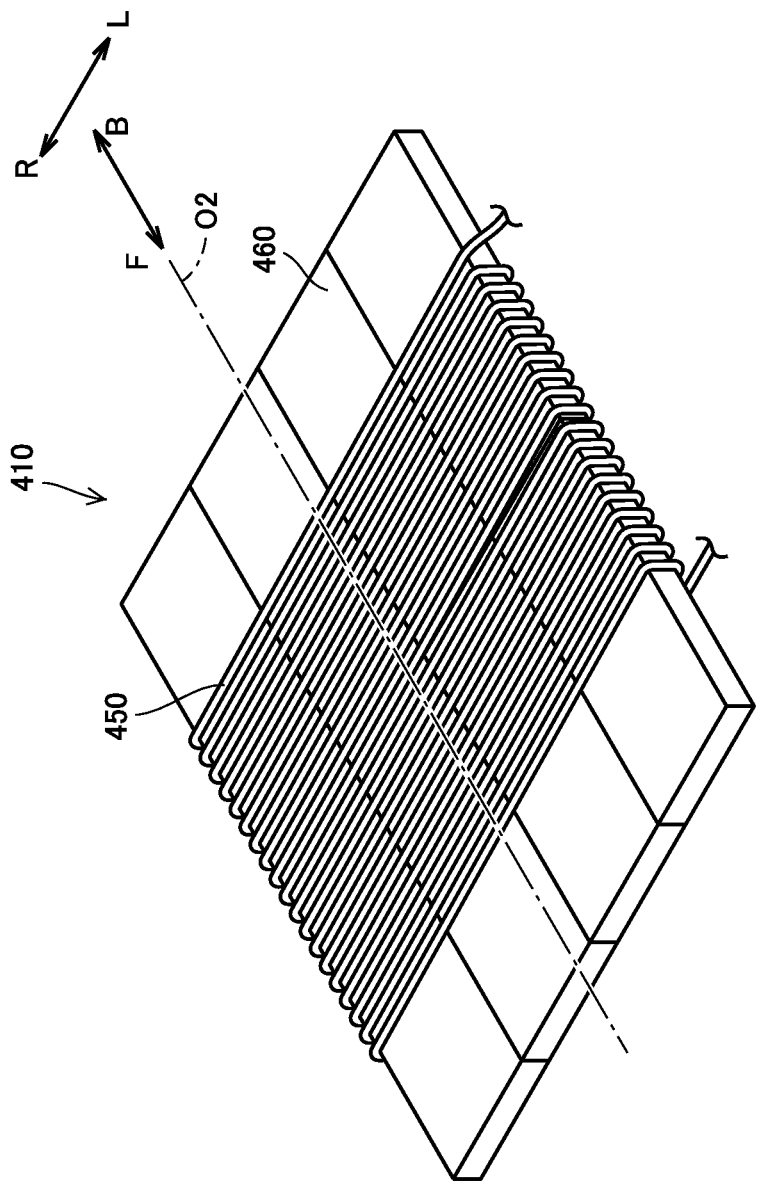
FIG. 13 is a perspective view showing a structure of a coil unit and a power transmission coil in a state placed in the parking area in the third embodiment.

With reference to FIGS. 12 and 13, a structure of power transmission unit 410 will be described. The basic structure is the same as that of the above power receiving unit 210, and power transmission unit 410 includes a power transmission coil 450, and a core unit 460. In core unit 460, power transmission coil 450 is spirally wound around surroundings including upper and lower surfaces of core unit 460 with a coil-winding axis (horizontal axis) O1 extending along a front-back direction (arrow BF direction in the drawing) of a vehicle as the center. Core unit 460 is the same as core unit 260 of power receiving unit 210.

Power transmission coil 450 and core unit 460 are sealed by resin 430, and power transmission unit 410 has a flat plate-like cube shape as a whole. A total of four attachment flanges 417 integrally molded by resin and having attachment holes are provided on lateral surfaces of power transmission unit 410, and are fixed to parking area B by using bolts 418.

(Fixing of Power Transmission Unit 410)

Figure 14:
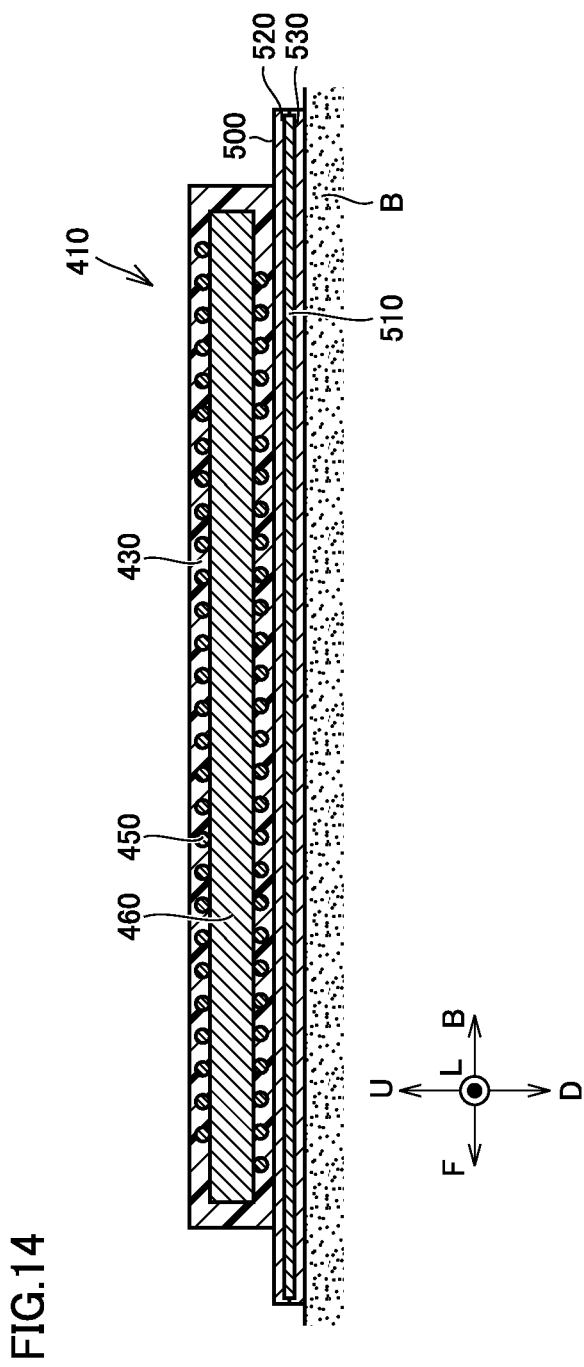
FIG. 14 is a sectional view showing a placed state of the power transmission unit and the magnetic shield in a state placed in the parking area in the third embodiment.

With reference to FIG. 14, a fixed state of power transmission unit 410 to parking area B will be described. Magnetic shield 500 is located below power transmission unit 410, and power transmission unit 410 and magnetic shield 500 are fixed to parking area B such that magnetic shield 500 is interposed between power transmission unit 410 and parking area B. A size of magnetic shield 500 in plan view is a size including power transmission unit 410 (similar to the case of power receiving unit 210 shown in FIG. 4).

Description of the structure and function of magnetic shield 500 is similar to the description referring to FIGS. 5 to 8, and therefore will be omitted herein.

Thus, also in a case of using magnetic shield 500 in this embodiment, a second magnetic sheet 530 is provided, thereby enabling suppression of leakage of an electromagnetic field M21 generated on a surface of metal sheet 510 to the outside (parking area B).

Fourth Embodiment

Figure 15:
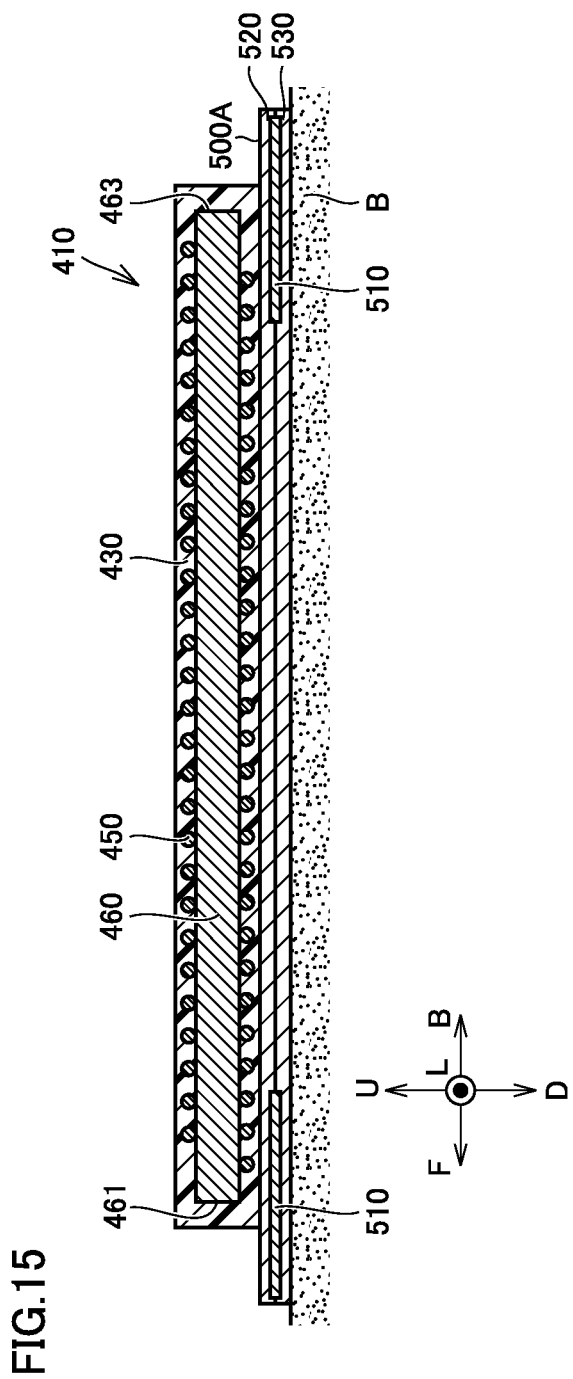
FIG. 15 is a sectional view showing a placed state of a power transmission unit and a magnetic shield in a state placed in a parking area in a fourth embodiment.

With reference to FIG. 15, a structure of a magnetic shield of this embodiment will be described. Similarly to a case where magnetic shield 500A is partially disposed, as shown in the above second embodiment, magnetic shield 500A may be configured such that a metal sheet 510 includes two sheets, namely a first metal sheet 510A disposed beside a first end along a coil-winding axis (horizontal axis) O1 of a power transmission unit 410, and a second metal sheet 510B disposed beside a second end along coil-winding axis (horizontal axis) O1 of power transmission unit 410.

In this case, magnetic flux M is emitted (or incident) from each of end faces 461 and 463 of a core unit 460, and therefore first metal sheet 510A is preferably disposed so as to include end face 461 in plan view, and second metal sheet 510B is preferably disposed so as to include end face 463 in plan view. Consequently, it is possible to reduce a cost required for providing the metal sheet, and to reduce weight of the metal sheet.

Although first metal sheet 510A and second metal sheet 510B are completely separated in FIG. 15, first metal sheet 510A and second metal sheet 510B may be partially connected by the metal sheet extending in the front-back direction.

Fifth Embodiment

In each of the above first and second embodiments, a case of using power receiving unit 210, in which power receiving coil 250 is spirally wound around the core unit with coil-winding axis (horizontal axis) O1 extending along the front-back direction (arrow BF direction in the drawing) of the vehicle as the center, is described. In this embodiment, a case of using a power receiving unit 210U, in which a spiral power receiving coil that is wound around a vertical axis O2 extending in a vertical direction is used as a power receiving coil 250, will be described.

Figure 16:
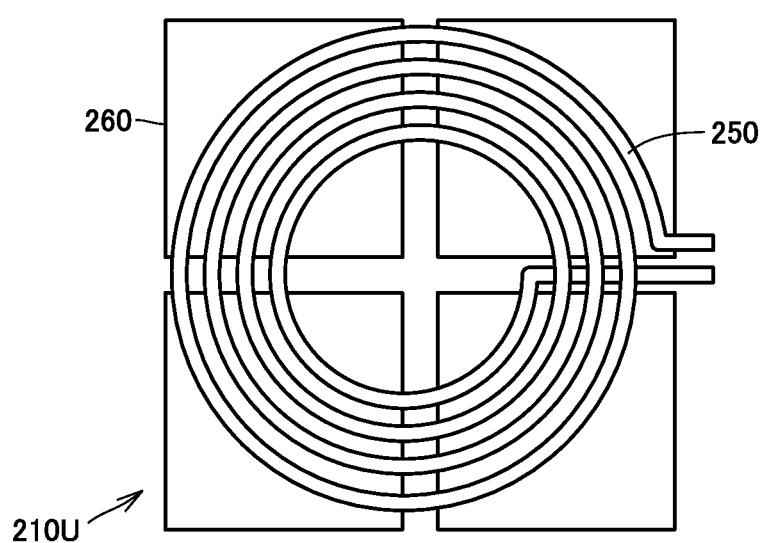
FIG. 16 is a diagram showing a structure of a power receiving unit in a state mounted in a vehicle in a fifth embodiment.
Figure 17:
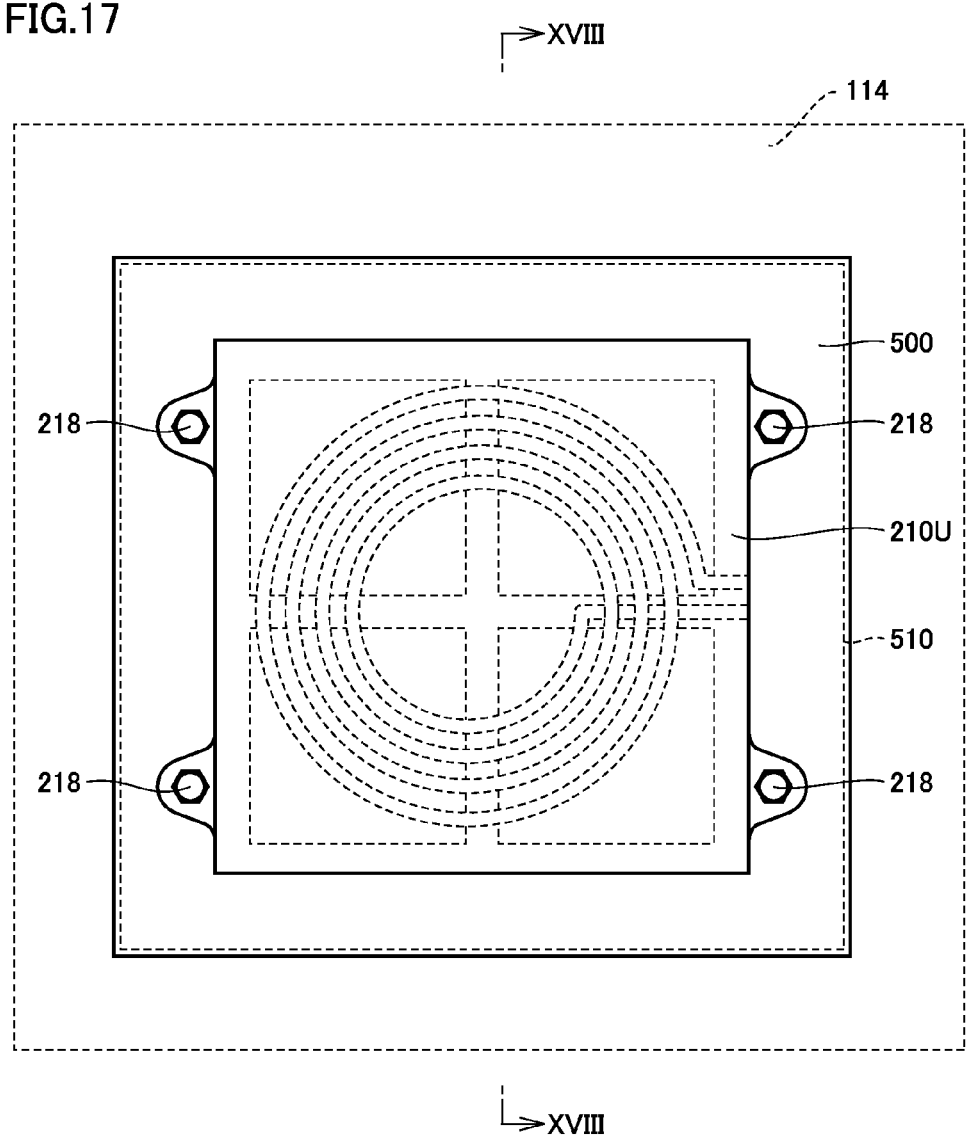
FIG. 17 is a bottom view (diagram as viewed from below) showing an arrangement relation between a power receiving unit and a magnetic shield in a state mounted in the vehicle in the fifth embodiment.
Figure 18:
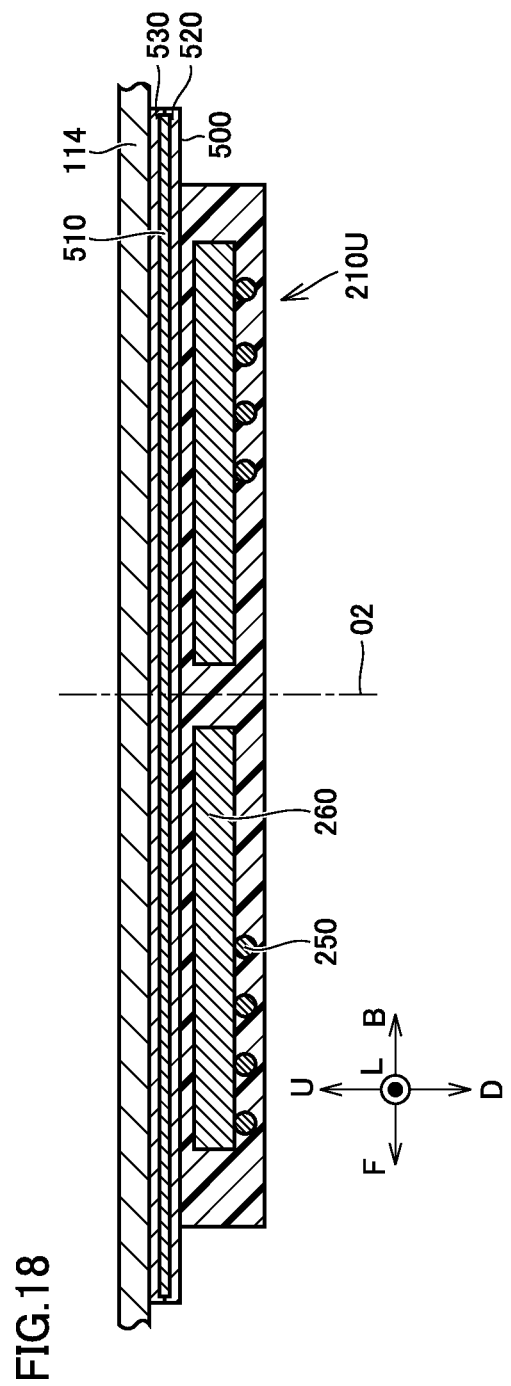
FIG. 18 is a sectional view taken along a line XVIII-XVIII in FIG. 17.

With reference to FIGS. 16 to 18, a structure of power receiving unit 210U will be described. Power receiving unit 210U includes power receiving coil 250, and a core unit 260. Spiral power receiving coil 250 wound around vertical axis O2 extending in the vertical direction is disposed on a surface of core unit 260, the surface being opposite to a surface of core unit 260 that is located beside magnetic shield 500.

Core unit 260 has a plate-like shape as a whole. Core unit 260 is configured by combining a plurality of split cores, and these split cores are surrounded by insulating paper. As each of the split cores, ferrite is used. The unit core is not limited to the split cores, but may be a sheet of ferrite.

Power receiving coil 250 and core unit 260 are sealed by resin 230, and power receiving unit 210U has a flat plate-like cube shape as a whole. A total of four mounting flanges 217 integrally molded by resin and having attachment holes are provided on lateral surfaces of power receiving unit 210U, and fixed to a floor panel 114 located on a bottom surface of a vehicle body 110, by using bolts 218.

(Fixing of Power Receiving Unit 210U)

With reference to FIG. 18, a fixed state of power receiving unit 210 to floor panel 114 will be described. A power receiving unit 210 is fixed to floor panel 114 such that magnetic shield 500 is interposed between power receiving unit 210 and floor panel 114. As shown in FIG. 17, a size of magnetic shield 500 is a size including power receiving unit 210U in plan view.

Description of the structure and function of magnetic shield 500 is similar to the description referring to FIGS. 5 to 8, and therefore will be omitted herein.

Thus, also in a case of using magnetic shield 500 in this embodiment, a second magnetic sheet 530 is provided, thereby enabling suppression of leakage of an electromagnetic field M21 generated on a surface of metal sheet 510 to the outside (floor panel 114).

(Structure of Magnetic Shield of Another Mode)

Figure 19:
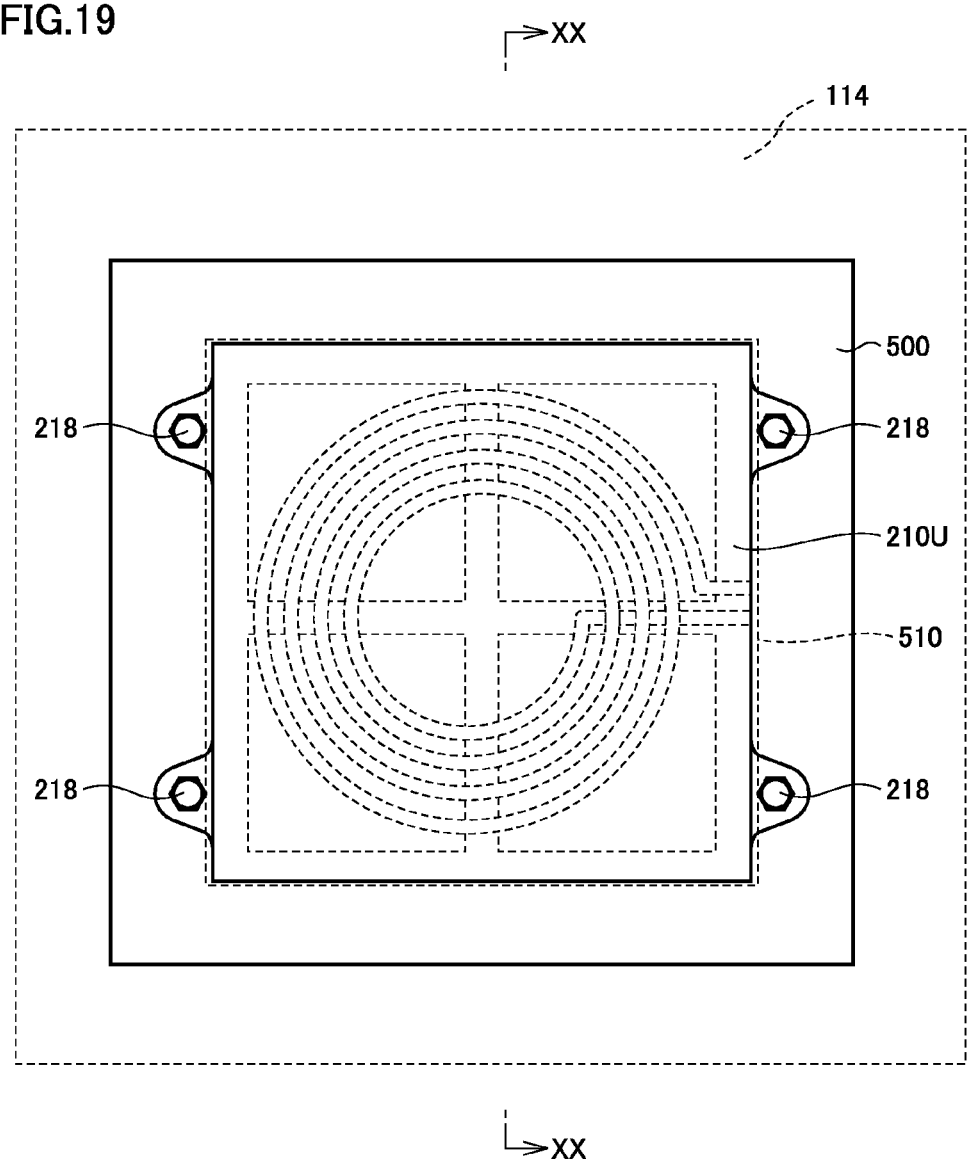
FIG. 19 is a plan view showing a structure of another magnetic shield in the fifth embodiment.
Figure 20:
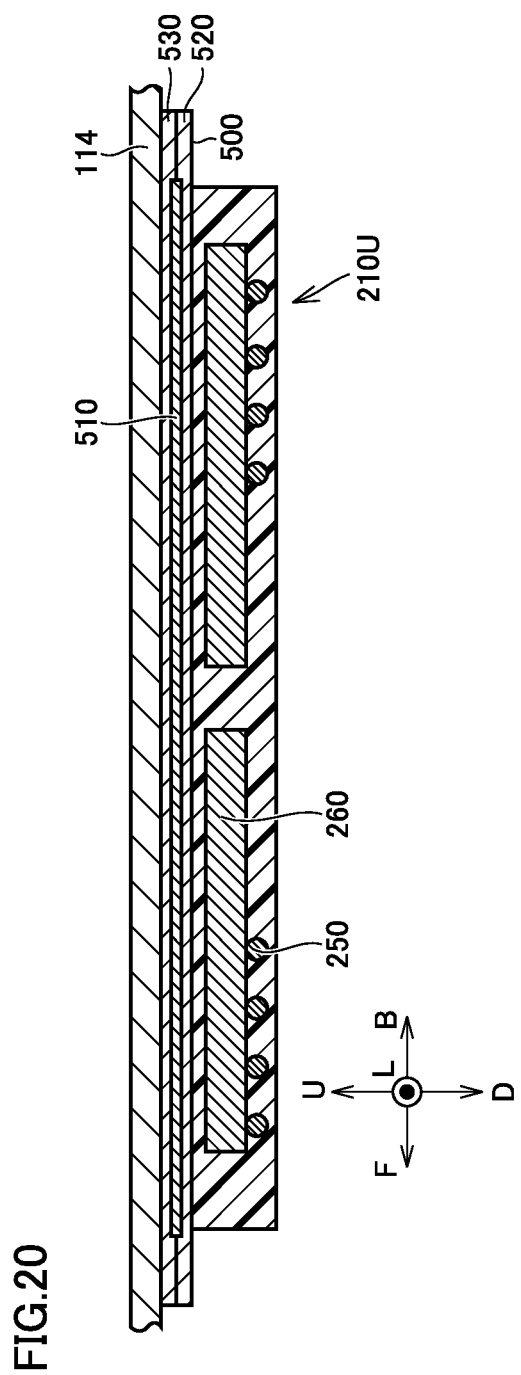
FIG. 20 is a sectional view taken along a line XX-XX in FIG. 19.

FIGS. 19 and 20 each show a sectional structure of a magnetic shield in another mode of this embodiment. In the case of using spiral power receiving coil 250 wound around vertical axis O2 extending in the vertical direction, magnetic flux concentrates on the center (vertical axis O2) of power receiving coil 250. Accordingly, a size of metal sheet 510 in plan view may be reduced to an almost planar size of power receiving unit 210U. Consequently, it is possible to reduce a cost required for providing metal sheet 510, and to reduce weight of the metal sheet.

Sixth Embodiment

While the attachment of power receiving unit 210U and magnetic shield 500 to floor panel 114 is described in the above embodiment, the attachment of a power transmission unit 410U and a magnetic shield 500 to a parking area B in an external power supply device 300 will be described in this embodiment with reference to FIGS. 21 to 23.

(Structure of Power Transmission Unit 410U)

Figure 21:
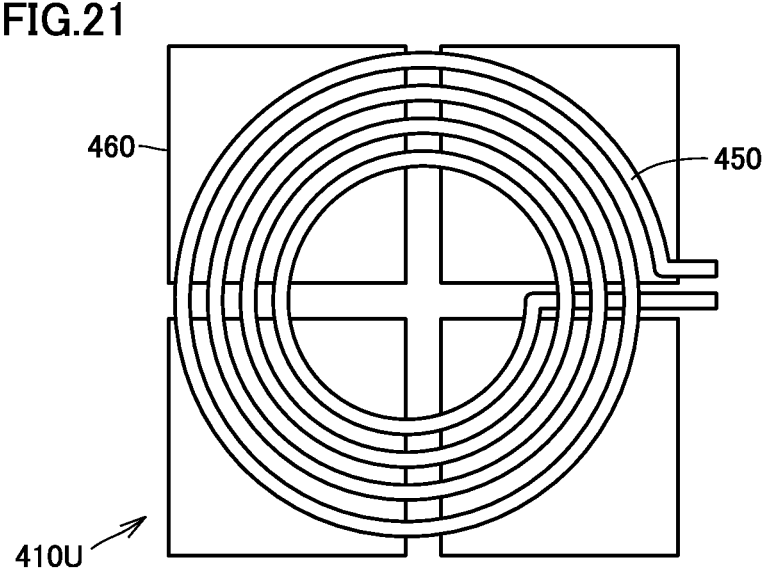
FIG. 21 is a diagram showing a structure of a power transmission unit in a state placed in a parking area in a sixth embodiment.
Figure 22:
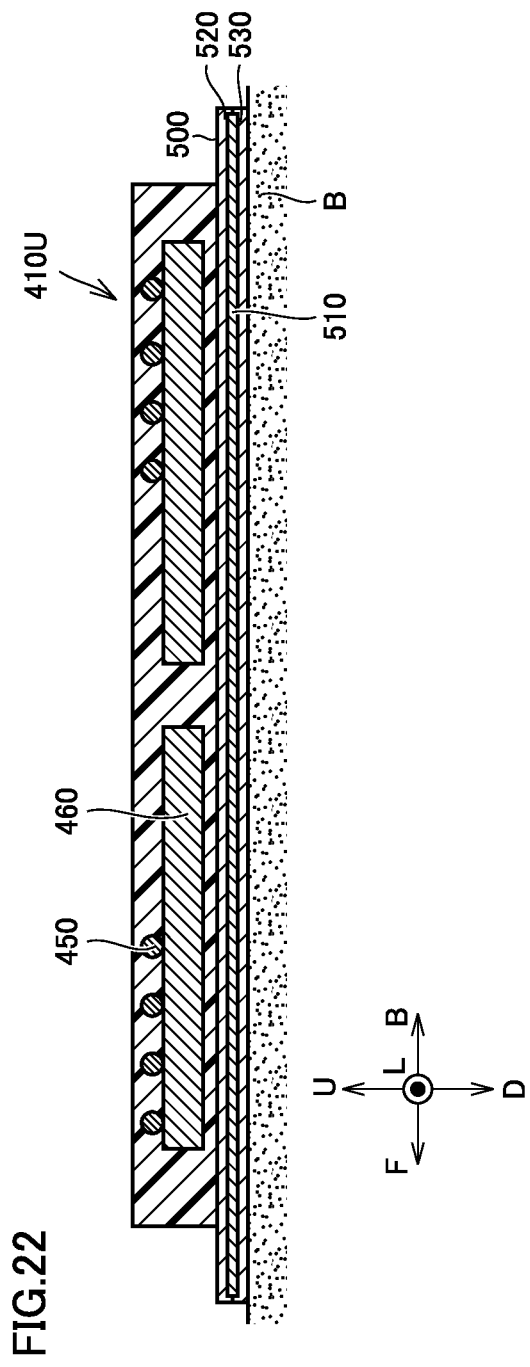
FIG. 22 is a sectional view showing a placed state of the power transmission unit and a magnetic shield in a state placed in the parking area in the sixth embodiment.

With reference to FIGS. 21 and 22, a structure of power transmission unit 410U will be described. The basic structure is the same as that of the above power receiving unit 210U, and power transmission unit 410U includes a power transmission coil 450, and a core unit 460. Spiral power receiving coil 450 wound around vertical axis O2 extending in a vertical direction is disposed on a surface of core unit 460, the surface being opposite to a surface of core unit 460 that is located beside magnetic shield 500. Core unit 460 is the same as core unit 260 of power receiving unit 210U.

Power transmission coil 450 and core unit 460 are sealed by resin 430, and power transmission unit 410 has a shape similar to an outer shape of the power transmission unit shown in FIG. 12, as a whole, and has a flat plate-like cube shape. A total of four attachment flanges 417 integrally molded by resin and having attachment holes are provided on lateral surfaces of power transmission unit 410, and are fixed to parking area B by using bolts 418.

(Fixing of Power Transmission Unit 410U)

As shown in FIG. 22, a fixing state of power transmission unit 410U is the same as a fixed state of power transmission unit 410 to parking area B, which is shown in FIG. 14, and power transmission unit 410U is fixed to parking area B such that magnetic shield 500 is interposed between power transmission unit 410U and parking area B. A size of magnetic shield 500 in plan view is a size including power transmission unit 410 (similar to the case of power receiving unit 210 shown in FIG. 4).

Description of the structure and function of magnetic shield 500 is similar to the description referring to FIGS. 5 to 8, and therefore will be omitted herein.

Thus, also in a case of using magnetic shield 500 in this embodiment, a second magnetic sheet 530 is provided, thereby enabling suppression of leakage, to the outside (parking area B), of an electromagnetic field M21 generated on a surface of metal sheet 510.

(Structure of Magnetic Shield of Another Mode)

Figure 23:
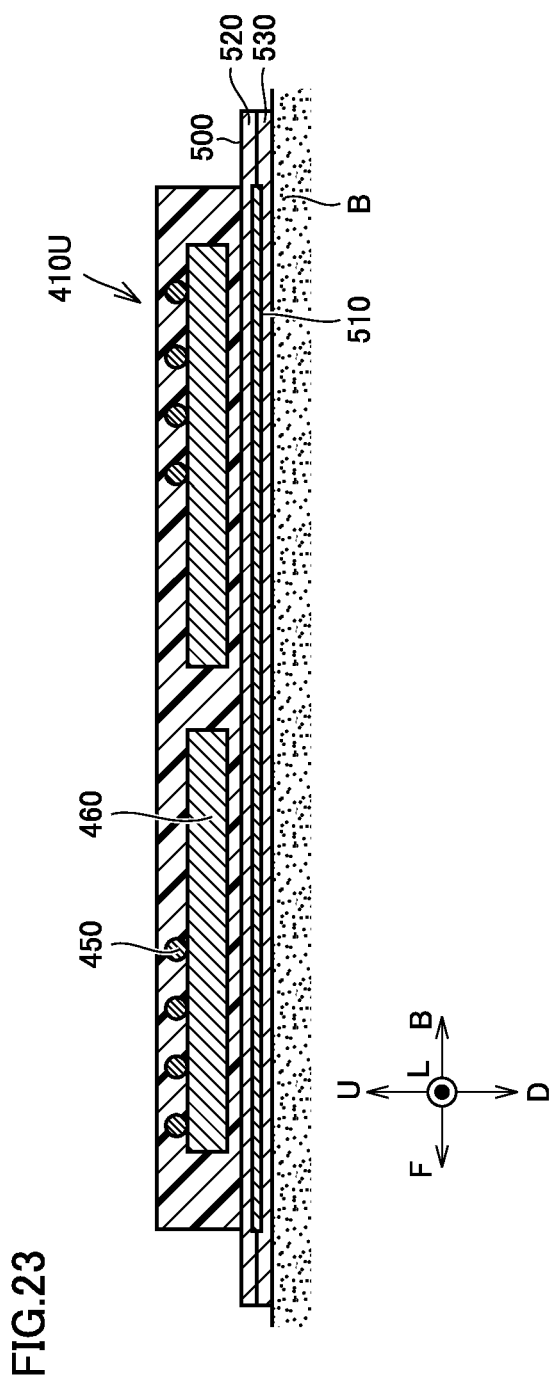
FIG. 23 is a sectional view showing a structure of another magnetic shield in the sixth embodiment.

FIG. 23 shows a sectional structure of a magnetic shield in another mode of this embodiment. Similarly to metal sheet 510 shown in FIGS. 19 and 20, magnetic flux concentrates on the center (vertical axis O2) of power receiving coil 250, and therefore a size of metal sheet 510 in plan view may be reduced to an almost planar size of power receiving unit 210U. Consequently, it is possible to reduce a cost required for providing metal sheet 510, and to reduce weight of the metal sheet.

As described above, according to the configuration of each embodiment, the configurations of magnetic shield 500 or 500A is employed, so that second magnetic sheet 530 can suppress discharge of an electromagnetic field to the outside even when the magnetic flux that rushes out of first magnetic sheet 520 generates an eddy current on the surface of metal sheet metal sheet, and this eddy current causes an electromagnetic field to be radiated from the surface of metal sheet 510.

Beside the power receiving device of each of the above first, second and fifth embodiments, power receiving unit 210 or 210U, and magnetic shield 500 are fixed to floor panel 114 such that magnetic shield 500 is in contact with a lower surface of floor panel 114, and power receiving unit 210 or 210U is in contact with a lower surface of magnetic shield 500. However, a clearance may be present between floor panel 114 and magnetic shield 500. Additionally, a clearance may be present between magnetic shield 500 and power receiving unit 210 or 210U.

Coil-winding axis (horizontal axis) O1 is disposed along the front-back direction of vehicle, but may be disposed along a right-left direction as long as the coil-winding axis is horizontally disposed.

The shape of floor panel 114 is not limited to the shape shown in the drawings. For example, a floor panel having a tunnel for allowing an exhaust pipe to pass may be employed.

Beside the power receiving device of each of the above third, fourth and sixth embodiments, power transmission unit 410 or 410U, and magnetic shield 500 or 500A are fixed to parking area B such that magnetic shield 500 or 500A is in contact with an upper surface of parking area B, and power transmission unit 410 or 410U is in contact with an upper surface of magnetic shield 500 or 500A. However, a clearance may be present between parking area B and magnetic shield 500. Additionally, a clearance may be present between magnetic shield 500 and power transmission unit 410 or 410U.

Magnetic shield 500 and power transmission unit 410 are placed on flat parking area B. However, parking area B is provided with a recess, and magnetic shield 500 and power transmission unit 410 are buried in this recess, and a surface of parking area B may be finished to be flat.

Coil-winding axis (horizontal axis) O1 is disposed along the front-back direction of the vehicle in each of the above first to fourth embodiments, but may be disposed along a right-left direction of the vehicle as long as the coil-winding axis is horizontally disposed.

In each embodiment, in a case where further leakage of magnetic flux from second magnetic sheet 530 in the three layer structure of magnetic shield 500 or 500A described above becomes a problem, a metal sheet and a magnetic sheet are simply provided on second magnetic sheet 530.

Figure 24:
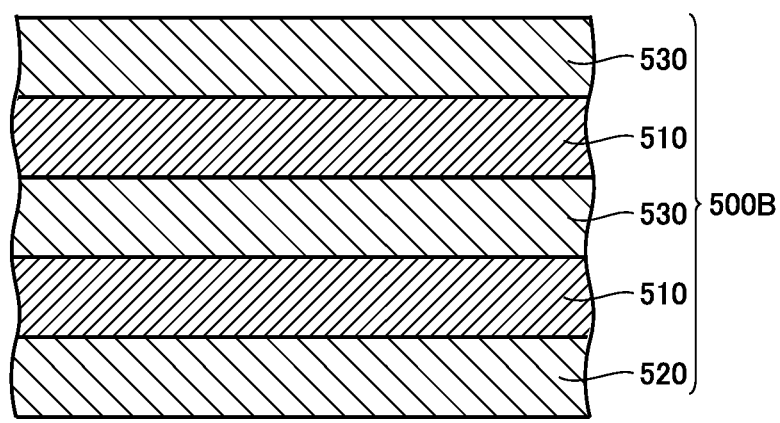
FIG. 24 is a sectional view showing a structure of another magnetic shield in each of the embodiments.

Accordingly, the structure of the magnetic shield is not limited to the three layer structure configured by the magnetic sheet, the metal sheet and the magnetic sheet. As shown in FIG. 24, as a magnetic shield 500B, a metal sheet 510 and a second magnetic sheet 530 may be further provided on a first magnetic sheet 520, a metal sheet 510, and a second magnetic sheet 530. Therefore, as the magnetic shield, any sheet having one or more conductive layer interposed between at least magnetic sheets may be employed.

The shapes of the power receiving unit, the power transmission unit, and the magnetic shield are not limited to the above rectangle shapes in each embodiment, but can be appropriately changed to circular shapes or the like, according to the shape of the coil.

In the description of each of the above embodiments referring to the drawings, when a number, an amount or the like is mentioned, the scope of the present invention is not necessarily limited to the number, the amount or the like, unless otherwise specified. The same reference numerals denote the same or corresponding components, and overlapping description may not be repeated. Unless otherwise indicated, it is intended from the beginning to combine and use configurations described in the respective embodiments as appropriate.

Although the present invention has been described and showed in detail, it is clearly understood that the same is by way of illustration and example only and is not to be taken by way of limitation, the scope of the present invention being interpreted by the terms of the appended claims.

What is claimed is:

1. A power receiving device comprising:
   a power receiving unit for receiving power from a power transmission unit in a noncontact manner; and
   a magnetic shield located opposite to said power transmission unit with said power receiving unit interposed therebetween, and having at least a part facing said power receiving unit, wherein
   said magnetic shield includes:
      a first magnetic sheet located beside said power receiving unit;
      a conductive sheet located opposite to said power receiving unit with said first magnetic sheet interposed therebetween; and
      a second magnetic sheet located opposite to said first magnetic sheet with said conductive sheet interposed therebetween.

2. The power receiving device according to claim 1, wherein
   said second magnetic sheet is provided so as to have a thinner thickness than said first magnetic sheet.

3. The power receiving device according to claim 1, wherein
   said power receiving unit includes a power receiving coil wound around a horizontal axis extending in a horizontal direction, and
   said conductive sheet has:
      a first conductive sheet disposed beside a first end along said horizontal axis of said power receiving unit; and
      a second conductive sheet disposed beside a second end along said horizontal axis of said power receiving unit.

4. The power receiving device according to claim 3, wherein
   said second magnetic sheet is provided so as to have a thinner thickness than said first magnetic sheet.

5. The power receiving device according to claim 1, wherein
said power receiving unit includes a power receiving coil wound around a vertical axis extending in a vertical direction, and
said conductive sheet is disposed so as to include a position where said axis passes.

6. A vehicle comprising:
a power receiving device; and
a vehicle body having a floor panel, wherein
said power receiving device includes:
   a power receiving unit for receiving power from a power transmission unit in a noncontact manner; and
   a magnetic shield located opposite to said power transmission unit with said power receiving unit interposed therebetween, and having at least a part facing said power receiving unit,
said magnetic shield includes:
   a first magnetic sheet located beside said power receiving unit;
   a conductive sheet located opposite to said power receiving unit with said first magnetic sheet interposed therebetween; and
   a second magnetic sheet located opposite to said first magnetic sheet with said conductive sheet interposed therebetween, and
said magnetic shield is disposed between said power receiving unit and said floor panel.

7. A power transmission device comprising:
a power transmission unit for transmitting power to a power receiving unit in a noncontact manner; and
a magnetic shield located opposite to said power transmission unit with said power transmission unit interposed between said magnetic shield and said power transmission unit, and having at least a part facing said power transmission unit, wherein
said magnetic shield includes:
   a first magnetic sheet located beside said power transmission unit;
   a conductive sheet located opposite to said power transmission unit with said first magnetic sheet interposed therebetween; and
   a second magnetic sheet located opposite to said first magnetic sheet with said conductive sheet interposed therebetween.

8. The power transmission device according to claim 7, wherein
said second magnetic sheet is provided so as to have a thinner thickness than said first magnetic sheet.

9. The power transmission device according to claim 7, wherein
said transmission unit includes a power transmission coil wound around a horizontal axis extending in a horizontal direction, and
said conductive sheet has:
   a first conductive sheet disposed beside a first end along said horizontal axis of said power transmission unit; and
   a second conductive sheet disposed beside a second end along said horizontal axis of said power transmission unit.

10. The power transmission device according to claim 9, wherein
said second magnetic sheet is provided so as to have a thinner thickness than said first magnetic sheet.

11. The power transmission device according to claim 7, wherein
said power transmission unit includes a power transmission coil wound around a vertical axis extending in a vertical direction, and
said conductive sheet is disposed so as to include a position where said axis passes.

* * * * *